A. P. WOLFE.
BEAN SNIPPING MACHINE.
APPLICATION FILED MAY 1, 1920.
1,436,746.
Patented Nov. 28, 1922.
5 SHEETS—SHEET 1.
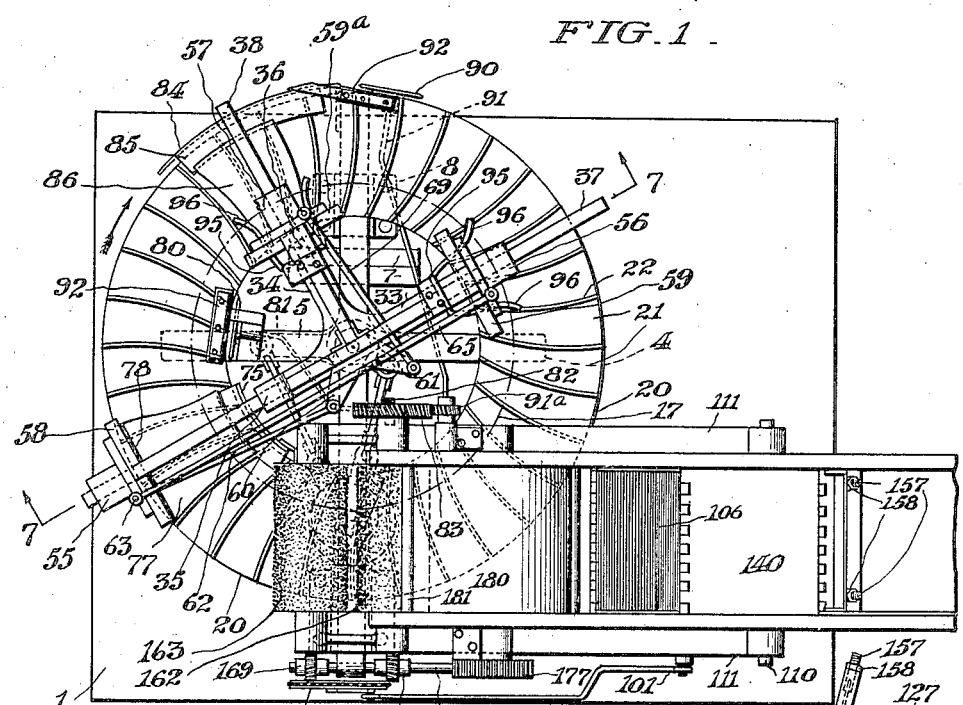
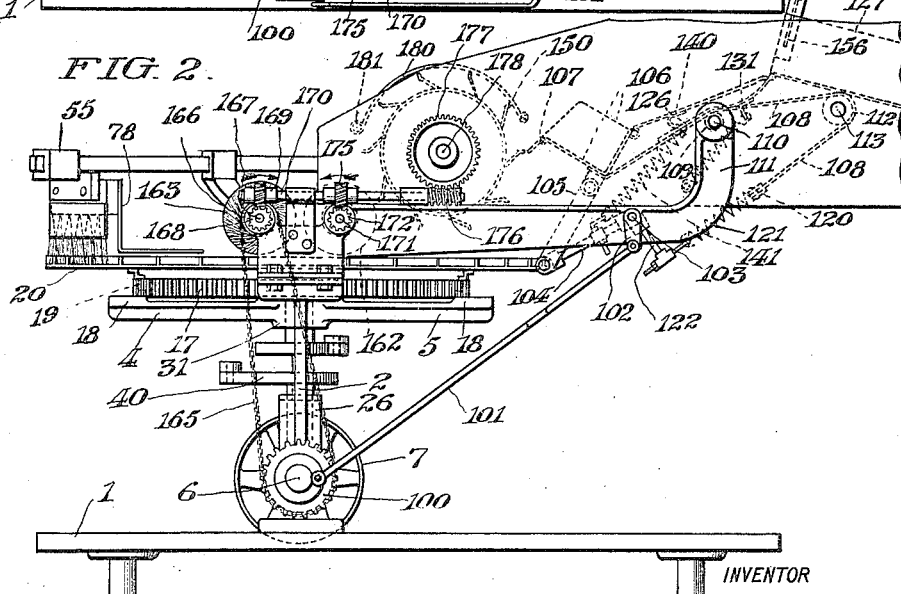
INVENTOR
Arthur P. Wolfe
BY
ATTORNEY A. P. WOLFE.
BEAN SNIPPING MACHINE.
APPLICATION FILED MAY 1, 1920.
1,436,746.
Patented Nov. 28, 1922.
5 SHEETS—SHEET 2.
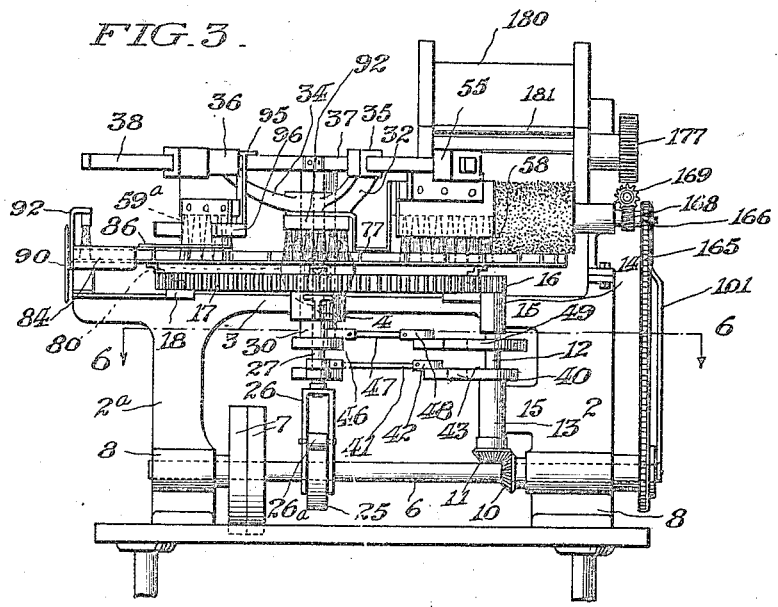
FIG. 3.
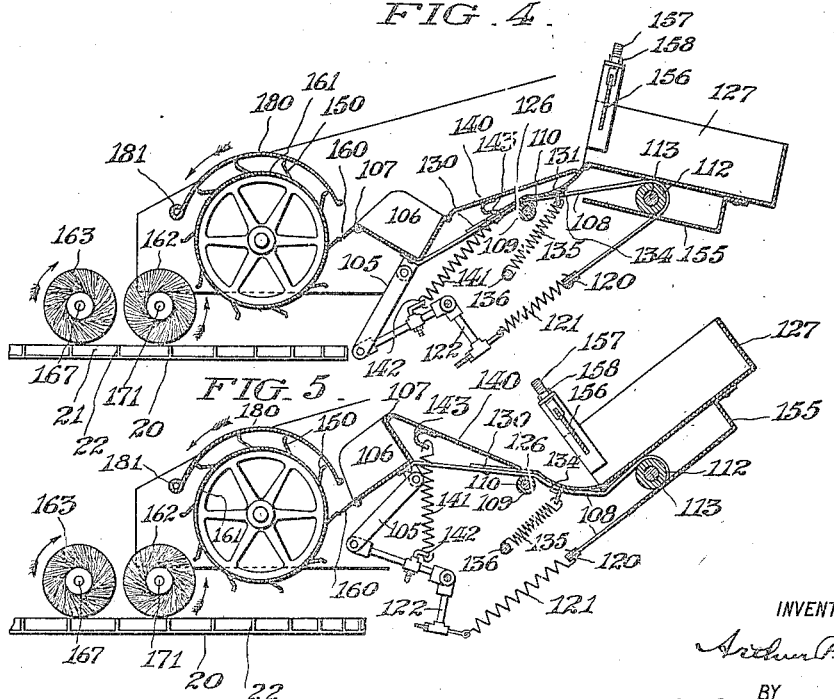
FIG. 4.
FIG. 5.
INVENTOR
Arthur P. Wolfe
BY
Cyrus N. Anderson
ATTORNEY A. P. WOLFE.
BEAN SNIPPING MACHINE.
APPLICATION FILED MAY 1, 1920.
1,436,746.
Patented Nov. 28, 1922.
5 SHEETS—SHEET 3.
FIG. 6.
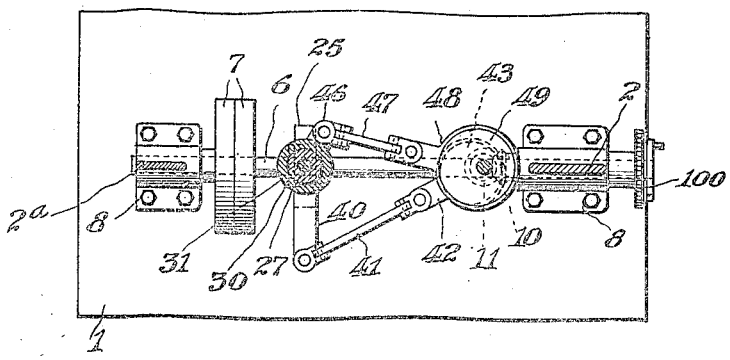
FIG. 7.
FIG. 10.
INVENTOR
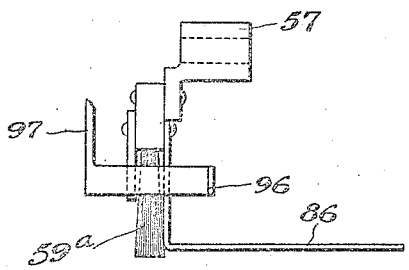
ATTORNEY

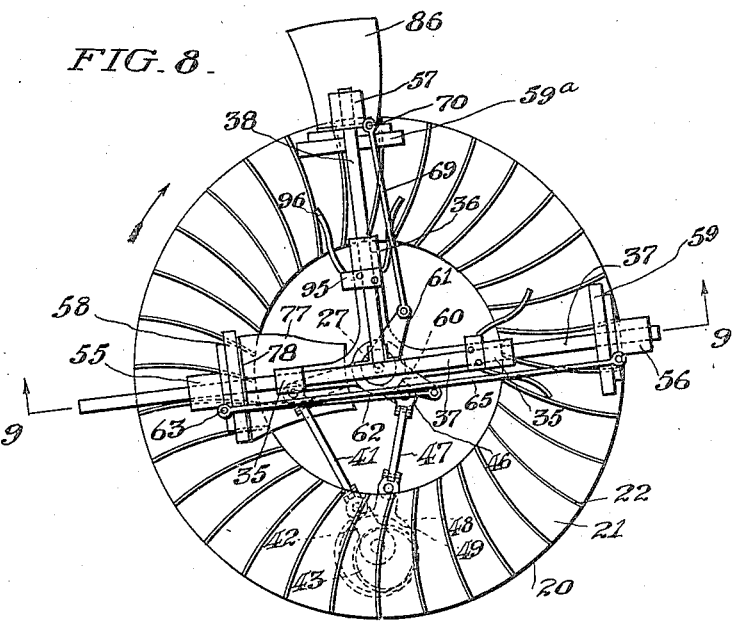

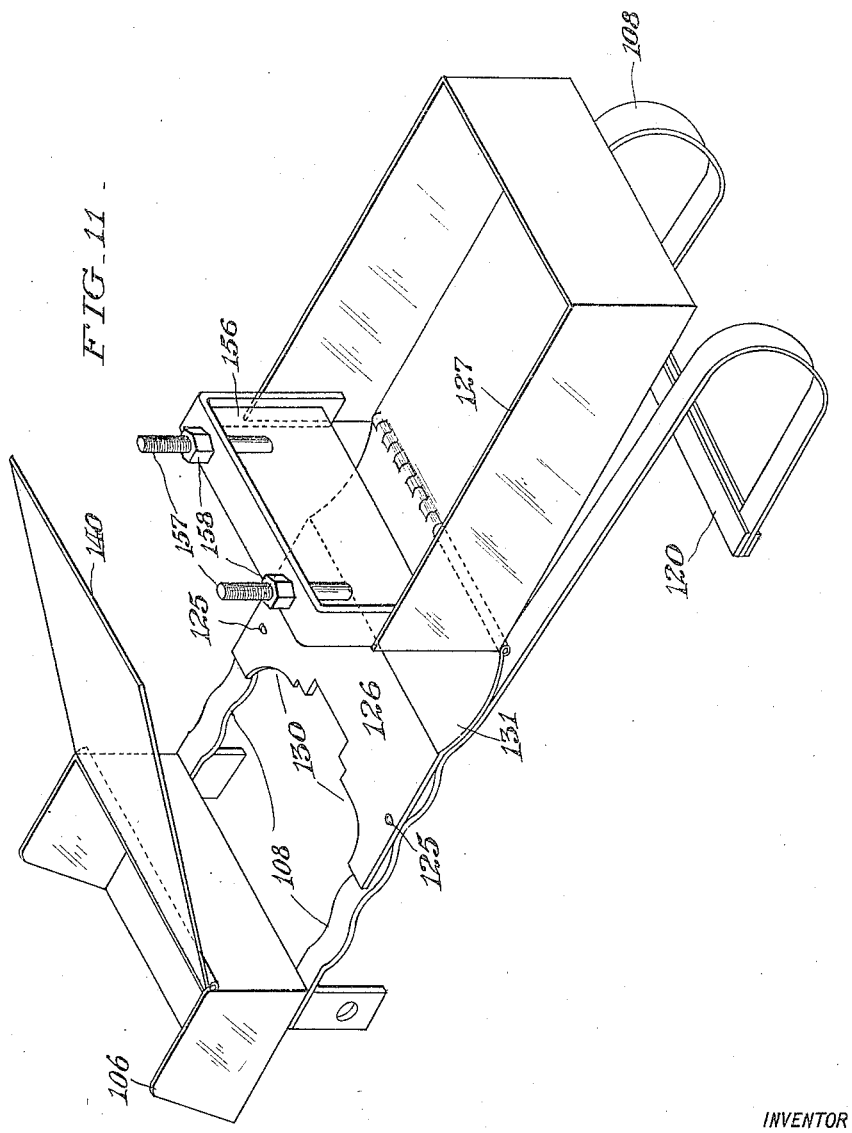

Patented Nov. 28, 1922.

1,436,746

UNITED STATES PATENT OFFICE.

ARTHUR P. WOLFE, OF PHILADELPHIA, PENNSYLVANIA.

BEAN-SNIPPING MACHINE.

Application filed May 1, 1920. Serial No. 378,071.

*To all whom it may concern:*

Be it known that I, ARTHUR P. WOLFE, a citizen of the United States, and a resident of Philadelphia, in the county of Philadelphia and State of Pennsylvania, have invented an Improvement in Bean-Snipping Machines, of which the following is a specification.

In its broader aspects my invention relates to vegetable snipping or trimming machines, although I have illustrated the same as embodied in a machine adapted to and for the specific purpose of snipping or trimming off the ends of string beans.

My invention has for its object generally to provide a snipping machine, which, in relation to the operations performed thereby, is extremely simple in its construction and is efficient and positive in its action.

Another and more specific object of my invention is to provide a construction in which the operations of the feeding mechanism are timed and correlated with respect to carrier pockets or their equivalents on a traveling carrier in such manner that the number of beans or groups of beans delivered from said mechanism onto the carrier and into the carrier pockets or their equivalents corresponds exactly with the number of carrier pockets or equivalents which pass the delivery point of such mechanism.

I have made no attempt to point out all of the objects and advantages of my invention, but other objects and advantages will be pointed out in the detailed description thereof which follows or will be apparent therefrom.

In order that my invention may be readily understood and its many practical advantages fully appreciated, reference may be had to the accompanying drawings in which I have illustrated one form of embodiment thereof. However, it will be understood that my invention is susceptible of embodiment within the scope of the claims in other forms of construction than that shown.

In the drawings:

Fig. 1 is a top plan view of a machine embodying my invention;

Fig. 2 is a view in side elevation thereof looking toward the bottom of Fig. 1;

Fig. 3 is a view in front elevation looking from the left toward the right in Fig. 1;

Fig. 4 is a view in sectional and side elevation of the feed mechanism, the ends of the brush rollers for delivering the beans to the carrier pockets and a portion of the edge of the carrier with its pockets being shown in elevation.

Fig. 5 is a view similar to that shown in Fig. 4 but with certain of the parts shown in different positions;

Fig. 6 is a transverse sectional view taken on the line 6—6 of Fig. 3;

Fig. 7 is a vertical sectional view taken on the line 7—7 of Fig. 1, some of the details of construction being omitted for the sake of clearness;

Fig. 8 is a top plan view of the carrier dial and certain associated operative parts, their operation being indicated;

Fig. 9 is a vertical sectional view taken on the line 9—9 of Fig. 8, but with the parts in different positions;

Fig. 10 is an enlarged side elevational view showing an edge of one of the brushes for shifting the beans upon the carrier, also showing the holder for the said brush and means for laterally compressing the brush when in certain positions; and Fig. 11 is a view in perspective of the feeding mechanism detached from the machine and the different co-operating or co-acting elements thereof being placed in straightened out or extended position with respect to each other.

Referring to the drawings: 1 designates a table or other support upon which the machine is supported. The frame of the machine comprises the uprights 2 and $2^a$ which at their lower ends are secured to the table 1. The upper ends of these uprights are connected by means of a cross piece or tie-bar 3 from which extend in opposite directions the arms 4 and 5.

6 designates the main or drive shaft of the machine provided with fast and loose pulleys 7. The said shaft is journaled in bearings 8 upon the uprights 2 and $2^a$. It is provided with a bevel gear 10 which is in engagement with a bevel gear 11 upon the lower end of a shaft 12 which is journaled in bearings 13 and 14 upon the inner ends of arms or brackets 15, which project from the upright 2. The bevel gears 10 and 11 bear a one-to-one relation with respect to each other. At its upper end the shaft 12 is provided with a pinion 16 which engages teeth upon the perimeter of an annular gear member 17 which is supported upon blocks 18 which in turn are supported upon the outer ends of the arms 4 and 5 and in proper positions upon the connecting or tie bar 3 of the frame of the machine. These blocks are provided with projections or abutments 19 upon their inner end or edge portions, the outer sides of which contact with the inner edge of the annular gear member 17. The ratio of the number of gear teeth upon the annular gear number 17 with respect to the number of teeth upon the pinion 16 is as sixteen-to-one.

Rotation of the driving shaft 6 causes rotation of the shaft 12 and rotation of the latter effects rotation of the annular gear member 17.

An annular or dial carrier 20 is secured to and supported upon the annular gear member 17 and rotates therewith. The said carrier is provided with radial and slightly curved pockets 21 upon the top side thereof, said pockets consisting of spaces intermediate the ribs 22. The said ribs slightly converge inwardly as shown in Fig. 1 so that the pockets are narrower at their inner ends than at their outer ends. In the construction shown there are thirty-two of these pockets.

The beans are delivered onto the carrier and into these pockets 21 by a feeding mechanism which will be described subsequently herein.

The shaft 6 is provided with a cam 25 which is situated intermediate the opposite sides of a yoke or guide 26 rotatably secured to the lower end of a longitudinally reciprocatory and oscillatable or rocking shaft or rod 27. The cam surface of the cam member 25 contacts with a roller 26$^a$ which is supported upon and is situated between the sides of the yoke or guide 26. Rotation of the said cam with the shaft 6 effects or causes longitudinal reciprocatory motion of the shaft 27. The shaft 27 extends upwardly through and is journaled in a hollow shaft member 30, which in turn is journaled in an elongated, cylindrical, sleeve-like member 31 supported in the frame structure of the machine as is shown in Fig. 7. The hollow shaft 30 likewise is adapted to be oscillated or rocked and also is adapted to be reciprocated within the bearing sleeve 31. The upper end of the hollow shaft 30 is provided with three arms, 32, 33 and 34, the outer ends of which are provided with heads 35 and 36. The said heads have openings extending horizontally therethrough, said openings being radial with respect to the axis of the dial carrier.

A guide bar 37 is supported in the openings 35 in the heads 32 and 33, while a guide bar 38, secured at its inner end to the central portion of the guide bar 37, extends outwardly through the opening in the head 36 and is supported by the latter.

Adjacent its lower end the shaft or rod 27 is provided with an arm 40 which projects laterally and radially therefrom and is connected at its outer end to one end of a link or connecting rod 41, the other end of the latter being connected to an eccentric strap 42 upon an eccentric 43 upon the upright shaft 12. As before stated the hollow shaft member 30 is oscillatable or rockable in its bearing 31. The said hollow shaft is provided at its lower end with a laterally and radially projecting arm 46 which is connected to one end of the link or connecting rod 47, the other end of which is connected to an eccentric strap 48 upon an eccentric 49.

It will be noted that the upper end of the rod 27 is provided with a collar 50 which is rigidly secured thereto and that the upper ends of said bar and the said collar contact with the guide bars 37 and 38 so that, when the shaft 27 is moved up and down or reciprocated by the action of the cam 25 thereon, a like movement is imparted to the hollow shaft 30. Such movement of the guide arms or bars 37 and 38 causes like movement of such mechanism as may be supported thereon. It will also be noted that both the said members 27 and 30 are oscillated by the action of the eccentrics, connecting links and arms above described.

Supported and slidable upon the opposite end portions of the support and guide bar 37 and also upon the outer portion of the support and guide bar 38 are brush supporting heads 55, 56 and 57. The brushes 58, 59 and 59$^a$ are respectively secured to the said heads in any suitable manner. These brushes are of ordinary shape and may be described generally as being of fan shape and as extending transversely of the pockets 21, as is clearly indicated in the drawings. These brush holders and brushes are adapted to be reciprocated or moved back and forth upon the arms or bars 37 and 38. Such movement of the brushes and brush heads upon the supporting arms or bars 37 and 38 is effected by means of arms 60 and 61 angularly related with respect to each other as is shown in Fig. 8 of the drawings, and secured to the collar 50 at the upper end of the shaft 27. To the outer end of the arm 60 the inner end of a link 62 is secured. At its outer end the said link is connected at 63 to the brush head or brush head structure 55. The latter structure and the outer end of the said link 62 are connected to the brush head or brush head structure 56 upon the opposite end portion of the supporting bar 37 by means of a link 65. It will be seen, therefore, that rocking or oscillating movement of the arm 60 effects longitudinal back and forth or reciprocatory movement of the link 62 and by reason of the connection of the outer end of the latter with the brush head or brush head structure 55 and with one end of the link 65, the opposite end of the latter being connected with the brush head or brush head structure 56, reciprocation of the said brushes upon the said supporting arm is effected, the arrangement being such that as the brush head structure 55 and brush 58 move outwardly over the annular dial plate, the brush head structure 56 and brush 59 move inwardly thereover.

The outer end of the arm 61 is connected to the inner end of a link 69, the outer end of which is connected to the brush head or brush head structure 57, as indicated at 70. As already stated, the arm 61 is rocked or oscillated by the rocking or oscillating movement of the rod 27. Such oscillating or rocking movement of the arm 61 effects in and out or reciprocatory movement of the link 69, which in turn effects reciprocation or in and out movement of the brush head 57 and the brush secured thereto upon the arm 38.

The brushes 58, 59 and 59$^a$ travel back and forth transversely with respect to the dial carrier, the said respective brushes, when moving in one direction, being projected into the said pockets and when moving in the opposite direction, being lifted above the said pockets as and for the purpose hereinafter described.

Immediately after the beans have been deposited in the pockets 21 upon the dial carrier 20 they are carried forward thereby and are moved or adjusted inwardly by the action of the brush 58 to cause their inner ends to contact with the gauge 75 stationarily supported adjacent the inner edge of the said dial. The upper edge of the said gauge is provided with a narrow, outwardly projecting flange 76 which extends over the inner ends of the pockets 21, said flange being situated adjacent to or in contact with the upper edges of the ribs 22.

Associated with the brush 58 is a hold-down member comprising a horizontal inwardly extending plate 77 which at its outer end or edge is provided with a right angular projection 78 which is secured to the brush head structure in any desired manner. The said hold-down plate 77 is situated adjacent the upper edges of the ribs 22 and is of such length that when the brush 58 is in its outermost position the inner end or edge thereof slightly overlaps the outer edge of the flange 76, as is shown in Fig. 7 of the drawings. By reason of the fact that the inner edge or end of the horizontal hold-down plate 77 overlaps the outer edge of the flange 76, it is apparent that the inner ends of the beans which are located under the hold-down plate and which are swept forward by the brush 58 when it moves or sweeps inwardly will be compelled to pass underneath the flange 76 and thus will be moved into abutting relation with respect to the gauge 75.

The beans pass forward from the gauge 75 to the rotary cutter 80 mounted upon the outer end of a flexible shaft 81, the inner end of which is connected to a spiral gear 82 driven by a spiral gear 83. After the inner ends of the beans have been snipped or cut off they are moved forward by the carrier and are shifted outwardly in the pockets 21 by the brush 59$^a$ so as to cause their outer ends to contact with the gauge 84. The latter is provided with an inwardly extending flange 85 which extends over the outer end portions of the pockets 21 and is adjacent to or in contact with the upper edges of the ribs 22. Associated with the brush 59$^a$ is a hold-down plate 86 which is of the same shape and arrangement as that of the hold-down plate 77 previously referred to. In the case of the plate 86, however, it is connected at its inner end to the brush head structure 57 and when the latter, together with the brush 59$^a$ is in its innermost position, the outer edge or end of the said plate 86 overlaps the inner edge of the flange 85. The gauge 84 and flange 85 terminate short distances from the rotary cutter 90 situated adjacent the outer edge of the dial 20 in position to snip or cut off the outer ends of the beans as they are carried against the same by the said carrier. In view of the fact that the hold-down plate 86, when in its innermost position, overlaps at its outer end the inner edge portion of the flange 85, it is apparent that as the beans are moved or swept outwardly by the brush 59$^a$ their outer ends must of necessity pass underneath the flange 85 and into abutting relation against the gauge 84.

The cutter 90 is supported upon the outer end of a flexible shaft 91 having connection at its opposite end to a spiral gear 91$^a$ driven from the spiral gear 83, previously referred to.

Associated with the respective cutters 81 and 90 are hold-down brushes 92, said brushes operating to hold the beans while their inner and outer ends respectively are being snipped or cut off.

After the outer ends of the beans are snipped off as just described, they are carried forward and are swept from the pockets 21 by the brush 59 into a chute or a receptacle which may be provided therefor.

The brushes employed are of a width substantially equal to the width of two adjacent pockets at their outer ends. It is apparent, therefore, that some means should be provided to compress the brushes 59 and 59$^a$ when they are moved inwardly to positions adjacent the inner edge of the annular dial plate. These brushes are particularly referred to and require such means because they are projected into the pockets 21 and should be in contact or practically in contact with the bottoms thereof as they move outwardly. No such means is necessary to be provided for the brush 58 because of the fact that during the outward movement of that brush it is raised to a position above the pockets and is dropped so as to enter the said pockets immediately preceding the beginning of its return inward movement. The brush being of a width just sufficient to permit it to enter between the outer ribs or two adjacent pockets at their outer ends, the lower ends of the brush will be compressed as the brush moves inwardly by the ribs.

It will be apparent from an inspection of Figs. 1 and 8 that as the brush 58 moves outwardly the brushes 59 and 59$^a$ move inwardly. As already stated, the brush 58 occupies a position above the pockets 21 during its outward movement. It follows, therefore, that the brushes 59 and 59$^a$, during their inward movement, occupy a position above the pockets 21 because the supporting bars 37 and 38 are rigidly and fixedly connected together and are raised and lowered together.

In order that the brushes 59 and 59$^a$ may be subjected to edgewise compression at the ends of their inward strokes and held in compression until they are depressed into pockets I have provided devices 95 having outwardly extending and curved diverging arms 96. These arms are stationarily supported by means of shanks or bracket-like portions 97 which are secured to any convenient stationary part of the machine. These arms, at points directly above the inner edge of the dial, are of a width substantially equal to that of the inner ends of two adjacent pockets 21; that is, equal to twice the width of the inner end of a single pocket.

In the operation of the device (without regard to the feeding mechanism) the dial is rotatably actuated in the manner already indicated and likewise the members 27 and 30 are simultaneously oscillatably actuated and also are vertically reciprocated. The arrangement is such that the forward movements of oscillation of the member 30, that is, movements in the same direction as that of the movement of the dial plate 20, effect like movements of the brushes 58, 59 and 59$^a$ with the same speed as that of the dial 20. Simultaneously with such forward movement, the brush 58 is being moved inwardly, with its lower end projecting into two adjacent pockets, while the other brushes 59 and 59$^a$ are being moved outwardly with their lower ends projecting into two adjacent pockets. It will be observed that during this period the brushes 58 and 59$^a$, the gauges 75 and 84, the flanges 76 and 85 projecting respectively from said gauges, and the hold down plates co-operate with the ribs or flanges 22 to close the pockets 21 and form closed containers in which the beans are held or contained while they are being shifted in one direction or the other into positions to have their ends snipped or cut off. As already pointed out, the brushes and hold down plates during this period are moving forwardly at the same rate of speed as the dial 20 so that at this time a movable closed pocket or container is provided for holding the beans. When the brush 58 has reached its innermost position and the brushes 59 and 59$^a$ have reached their outermost positions, the cam 26 actuates the parts 27 and 30 and the parts supported thereby upwardly so as to lift the brushes to positions with their lower ends slightly above the edges of the compartments 22 forming the pockets 21. Then the oscillation or rocking of the rod 27 operates to move the brush 58 outwardly to its outermost position upon the arm 37, while at the same time the other brushes 59 and 59$^a$, while in like elevated position, are moved inwardly to their innermost positions as shown in Fig. 2. After the brushes 58, 59 and 59$^a$ have reached these positions just described, the cam 26 permits the parts 27 and 30 to drop back into their lowermost positions so that the brushes, during their next period of movement, will sweep along or adjacent to the bottoms of two adjacent pockets 21.

The eccentrics 43 and 49 with the parts co-operating therewith effect oscillating movements or rotative movements of the parts 27 and 30 through distances sufficient to cause movements of the brushes back and forth through distances equal to the width of a single pocket and the speed of such movements is the same, as already indicated, as the speed of movement of the dial 20.

During the time or period that the brushes 58, 59 and 59$^a$ are in elevated position as already described they are being moved backwardly; that is, in a direction opposite to that of the movement of the dial 20. It will be understood that during such backward or reverse movement of the brushes through a distance equal to the width of one of the pockets, the dial itself is moving forward and during such period likewise moves a distance equal to the width of a pocket. Consequently two pockets, those from which the brushes were removed when they were moved into elevated position, pass by or underneath the brushes so that when the brushes are lowered they are in position to enter the next two pockets and operate upon the beans which may be present therein.

Having described the operation of the dial and the manner in which the beans are controlled and presented to the cutters. I shall now turn to and describe the feed mechanism by means of which the beans are delivered singly or in groups to the pockets 21 upon the dial 20.

The feeding mechanism is best illustrated in Figs. 1, 2, 4, 5 and 11 of the drawings.

The main drive shaft 6 is provided at one end outside the frame structure of the machine with a sprocket wheel 100 to which is connected a link 101 which is inclined upwardly and at its outer end is connected to an arm 102 which in turn is connected to a rock shaft 103. Secured to the said rock shaft, preferably at its center, is a bell crank lever, one arm 104 of which extends forwardly and outwardly and is connected at its forward end to a link or a couple of parallel links 105, the opposite upper ends of which are connected to a bean feeding or delivery box 106, the rear end of which is closed, as is clearly indicated in Fig. 4, while the forward end thereof is open as shown. The said forward end is pivotally supported at 107. 108 designates a plurality of leather belts or straps which are secured at their forward ends to the underneath side of the rear end portion of the feed or delivery box 106. These belts or straps extend rearwardly from their points of connection to the feed or delivery box 106 and pass over rollers 109 upon a stationary rod 110 supported in the upturned ends of rearwardly extending brackets 111. The said bands also extend over a rotatable sleeve 112 upon a rod 113 and then are extended downwardly and forwardly as shown in Figs. 4 and 5. Their outer ends are connected together by the tie bars 120. The latter are connected to the outer rear end of a spring 121, the inner forward end of which is connected to the lower end of an arm 122 of the bell crank previously referred to upon the rod 103.

The straps or belts 108 are connected by rivets 125 to the opposite sides of a bean receiving plate 126 which is pivotally connected at its rear end or edge to the bottom edge of the forward end of a hopper 127. The forward central portion of the bean receiving member 126 is cut away as indicated at 130.

It will be observed that the rear portion of the member 126 is curved to form a trough-like portion or groove 131 as is clearly shown in Fig. 11 of the drawings. The beans are delivered from the hopper 127 directly into this trough-like portion, such delivery being made when the parts are in the position shown in Fig. 5. This change in position from that shown in Figs. 2 and 4 is effected by rotating or rocking the bell crank lever comprising the arms 104 and 122 in a clockwise direction from the position shown in Figs. 2 and 4.

The bean received plate rests upon the straps 108 and rocks thereon with respect to the rod 110 and as the said straps move through limited distances back and forth over the rollers 109 like movement is imparted to said plate. The said plate is held yieldingly down against the said straps by a spring 135, the upper end of which is connected to the under side of the same at or near the center of the trough-like portion thereof while the lower end thereof is connected to a stationary rod 136. The said spring likewise has the effect of holding or of assisting in holding the said straps 108 down upon the rolls 109.

140 designates a plate which is pivoted at its forward end to the upper edge of the rear end of the feed box 106. The rear end of the said plate 140 rests and slides upon the bean receiving plate 126 and is held yieldingly against the same by a coiled spring 141, the lower end of which is connected to the arm 104 of the bell crank lever, as shown at 142. The upper end of said spring is connected to a hook 143 having connection with the under side of the plate 140. The said spring 141 and hook 143 pass down through the cut out portion 130 of the bean receiving plate 126.

When the parts are in the position shown in Fig. 5 of the drawings, the beans are fed or delivered from the hopper 127 into the trough of the bean receiving plate 126 and at the same time the beans which have previously been delivered by the shovel 140 into the feed box 106 are delivered onto the flights 150 of a feed drum, the construction and operation whereof will be described later on. As the parts are actuated by the link 101 to change them from the positions in which they are shown in Fig. 5 to that shown in Fig. 4, the rear edge of the shovel plate 140 slides rearwardly upon the feed receiving plate 126 and as it were picks up the beans which have been delivered into the trough of the said receiving plate. By reason of the fact that the forward end of the shovel plate 140 has been lowered, the rear end thereof having been at the same time raised, the beans which are picked up by the said shovel plate slide thereover into the feed box 106 during the time that it is in the position as shown in Fig. 4. The supply hopper 127 is rockingly and slidably supported upon the sleeve 112 upon the rod 113, resting directly upon the straps 108. Although not essential, it is preferred that means be provided to retain the said supply hopper upon the said roller. For this purpose I have provided a bail plate or strip 155 which is secured to the bottom of the said hopper and which extends underneath sleeve 112. The presence of said bail does not interfere with the rocking and sliding movements of the hopper. I have also provided an adjustable plate 156 in the forward end portion of the hopper 127, which plate extends crosswise of the hopper and its lower edge is situated at such distance above the bottom of the hopper as may be found to give the best results. The means for adjusting the said plate 156 toward and from the bottom of the hopper 127 comprises screw threaded bolts 157 and nuts 158. The lower ends of the bolts are connected to the upper edge of the plate and support the same.

When the feed box 106 has been shifted to the position shown in Fig. 5, the beans which have been previously delivered thereinto while in the position shown in Fig. 4 are discharged onto a stationary plate or platform 160, the forward edge of which is in such position that the edges of the flights 150, as they are carried around upon the drum 161, pass in adjacent relation thereto, as is indicated clearly in the drawings. The beans slide from the platform 160 onto the flights 150 and are carried thereby around the drum and are delivered therefrom onto the feed delivery cylindrical brushes 162 and 163 which are situated in adjacent parallel relation with respect to each other and rotate in opposite directions or toward each other, as is indicated by the arrows in Figs. 4 and 5. The beans falling from the flights onto these brushes are carried in between the latter and are delivered into the pockets 21, as described in my previous application, filed August 12, 1919, Serial No. 318,030.

Actuation or rotation of the drum 161 with the flights thereon is effected by means of a sprocket chain 165 which is driven by means of the sprocket wheel 100. Said sprocket chain is in engagement with a sprocket wheel 166 upon the shaft 167 of the cylindrical brush 163. The outer end of said shaft is provided with a spiral gear 168 which is in engagement with a spiral gear 169 upon a shaft 170, which extends at right angles to the shaft 167 and also to the shaft 171 of the cylindrical brush 162. The shaft 171 is provided with a spiral gear 172 which is driven by a spiral gear 175 upon the shaft 170. The said shaft 170, adjacent its rear end, is provided with a worm 176 which is in mesh or engagement with a relatively large worm gear 177 which is secured to the shaft 178 of the drum 161. The spiral gear 83 previously referred to is secured to the inner end of the shaft 171.

180 designates a curved guard which is pivotally supported at 181 and extends over and slightly above the flights 150 upon the drum 161. The purpose of the guard is to prevent the accidental dropping or escape of the beans from the flights 150.

The relationship of the gears between the drive shaft and the dial for driving the latter is such in the present construction that for each sixteen revolutions of the drive shaft there is one revolution of the dial. Assume now that the drive shaft 6 makes eighty revolutions in a certain period of time, say one minute. During the same period of time the dial will make five revolutions due to the sixteen-to-one ratio or relationship previously referred to. There being thirty-two pockets in the dial and each pocket passing by the said delivery point underneath the delivery cylindrical brushes 162 and 163 five times, it is clear that during the said period one hundred and sixty pockets will pass underneath the said delivery rollers. It is desirable that one hundred and sixty beans or groups of beans shall be delivered in the same period of time. This is effected by so proportioning the driving mechanism intermediate the drive shaft 6 and the drum 161 that the latter is rotated or revolved sixteen times in the same period. There being ten flights upon the said drum, it is apparent, therefore, that in the said period there would be one hundred and sixty deliveries of beans to the cylindrical feed brushes 162 and 163.

It will be understood that one or more beans may be delivered to one of the flights upon the drum 161 each time that the feed box 106 is tilted into the position shown in Fig. 5 of the drawing.

The beans having been delivered into the pockets on the dial plate, they are carried forwardly and trimmed in the manner previously herein described.

It is apparent that I have provided a construction in which there is a direct co-operative relationship between the feeding mechanism and the trimming mechanism of the machine. The feeding mechanism is so related and so operated in relation to the dial and the pockets 21 therein that a bean or group of beans is specifically provided for and delivered to each pocket as it passes underneath the cylindrical feed brushes 162 and 163 and is in position thereunder to receive such bean or group of beans.

The word "bean" is employed in the specification and claims in connection with the title of the invention and in the description thereof for purposes of description and not of limitation, because, as will be understood, the principle of the invention may be embodied in machines employed for other purposes than that of snipping or trimming off the ends of beans.

Although my invention is shown in connection with an annular or dial carrier it is to be understood that it is not limited to a machine having such a carrier but may be employed in connection with or embodied in a machine in which a straight carrier or conveyor is employed.

I claim:

1. In a machine of the character stated, the combination of a traveling carrier having receiving pockets for receiving articles the ends of which are to be trimmed or snipped off, rotating means for delivering said articles to said pockets at intervals, and oscillating means for delivering said articles to said rotating means at intervals, the times between the intervals corresponding to the times between the passage of the pockets successively by the delivery point of the said delivering means.

2. In a machine of the character stated, the combination of a traveling carrier having receiving pockets for receiving articles the ends of which are to be trimmed or snipped off, means comprising a rotary member for delivering said articles to said pockets at intervals and oscillating means for delivering said articles at intervals to said rotary member, and means for actuating said delivering means synchronously with the movements of the said pockets.

3. In a bean snipping machine, the combination of a carrier having pockets therein, means for causing traveling movement of said carrier, mechanism comprising oscillating and rotating parts for feeding beans or like articles to the said pockets and means for actuating the said mechanism to effect feeding movement thereof at intervals corresponding to the intervals between the passage of successive pockets past the delivery point of said feeding mechanism.

4. In a bean snipping machine, the combination of a carrier provided with pockets therein, means for causing movement of said carrier so as to cause a predetermined number of pockets to pass by a fixed point in predetermined periods of time, mechanism for feeding beans or other like articles to the said pockets, and means for actuating the said mechanism comprising oscillating and rotating parts at a speed so related with respect to the speed of movement of the said carrier that one article or a group of articles will be delivered to each pocket as it passes underneath the delivery point of the said mechanism.

5. In a bean snipping machine, the combination of a traveling carrier having receiving pockets therein, means for causing traveling movement of said carrier, feeding mechanism for delivering beans or other like articles to said pockets, said mechanism comprising a member having delivery means thereon for successively delivering beans or groups of beans or like articles into the pockets of said carrier and oscillating means for supplying beans or other like articles to said delivery means, and means for causing rotation of said member and oscillation of said oscillating means to effect delivery of beans or groups of beans successively to said pockets.

6. In a bean snipping machine, the combination of a traveling carrier provided with receiving pockets, means for causing traveling movement of said carrier at a speed to cause a predetermined number of pockets to pass by a delivery point in a predetermined period of time, feeding mechanism for feeding beans or other like articles to said pockets, said mechanism comprising a rotatable member having transporting delivery flights thereon, and means for causing rotation of said member at a speed sufficient to cause the number of flights which pass by the said delivery point to equal the number of pockets which pass by the same point.

7. In a bean snipping machine, the combination of an annular carrier having receiving pockets therein, means for causing revolution of said carrier, feeding mechanism for delivering articles to said receiving pockets, means intermediate the first named means and the said mechanism for actuating the latter, the said mechanism comprising a rotatable member having flights thereon, the said member being driven at a speed so related to the speed of revolution of the said carrier that the number of flights which pass the delivery point in a predetermined time equals the number of receiving pockets which pass the same point in the same period of time.

8. In a bean snipping machine, the combination of an annular carrier provided with pockets to receive beans or other like articles the ends of which are to be snipped or cut off, means for causing revolution of the said carrier whereby the said pockets travel successively past a delivery point where the beans or other articles are delivered thereto, feeding mechanism comprising a rotatable member having bean or other like article transporting and delivery flights thereon, and means for causing rotation of said member at a speed so related to the speed or revolution of the said carrier that the number of delivery flights which pass the delivery point in a predetermined period of time equals the number of receiving pockets which pass the same point in the same period of time.

9. In a bean snipping machine, the combination of an annular carrier provided with receiving pockets, means for causing revolution of said carrier, a revoluble member for delivering beans or other like articles singly or in groups to said pockets, said revoluble member being provided with pockets for receiving and transporting the said beans or other like articles and delivering the same to the pockets in said carrier, oscillating means for delivering beans singly or in groups to the pockets upon said revoluble member, means for actuating the said last mentioned means for delivering the said articles to the said pockets upon the revoluble member, and means for causing revolution of said rotatable member at a speed sufficient to cause the number of delivery pockets thereon which pass the delivery point to equal the number of pockets upon the said carrier which pass the said point in the same period of time.

10. In a bean snipping machine, the combination of a traveling carrier provided with pockets for receiving beans or other like articles singly or in groups, means for causing traveling movement of said carrier so as to cause movement of the said pockets past a delivery point, a conveyer for delivering beans or other like articles singly or in groups to said pockets, said conveyer being provided with means at intervals thereon for holding and transporting the said beans or other like articles, rocking members, means for actuating the said rocking members for delivering the beans onto the holding means of said conveyer, and means for actuating the said conveyer at a speed sufficient to cause the number of holding means thereon which passes the delivery point in a predetermined period of time to equal the number of receiving pockets upon said traveling carrier which passes the said delivery point in the same period of time.

11. In a bean snipping machine, the combination of a traveling carrier having pockets therein adapted to receive beans or other like articles the ends of which are to be snipped or cut off, means for successively moving the beans in opposite directions in said pockets, said means moving back and forth transversely of the said carrier and longitudinally of the said pockets, and means for holding the said means above the said pockets when moving in one direction and permitting the same to enter the said pockets when moving in the opposite direction.

12. In a bean snipping machine, the combination of a traveling carrier having pockets therein, brushes for moving the said beans or other articles in opposite directions in said pockets, first into position to have one end cut off, second into position to have the other end cut off, and third to discharge the same from the said carrier, mechanism for lifting and holding the said brushes above the said pockets when moving in one direction and for permitting the same to enter the said pockets when moving in the opposite direction.

13. In a bean snipping machine, the combination of an annular carrier having pockets extending transversely thereof to receive beans or other like articles, the opposite ends of which are to be snipped or cut off, means for causing revolution of said annular carrier, brushes for causing the movement of beans or other like articles in opposite directions in said pockets, supports upon which said brushes are slidably carried, means for elevating and lowering the said support to effect vertical reciprocatory movements of the said brushes into positions above the said pockets and into position with their lower ends projecting into the said pockets, means for causing oscillatory movements of said brushes transversely of the said pockets, and means for causing reciprocatory movements of said brushes longitudinally of said pockets.

14. In a bean snipping machine, the combination of a traveling carrier having pockets therein adapted to receive beans or other like articles, brushes for causing movement of said beans or other articles in the said pockets, supports for said brushes, means for effecting vertical reciprocatory movements of said supports to cause like movements of said brushes, means for causing simultaneous oscillatory movements of said supports to cause like movements of said brushes, and means for causing horizontal reciprocatory movements of said brushes.

15. In a bean snipping machine, the combination of an annular carrier provided with pockets extending transversely thereof which pockets are adapted to receive beans or other like articles, the inner ends of said pockets being narrower than their outer ends, a plurality of relatively flat brushes for causing movement of said beans or other articles longitudinally of said pockets, said brushes being of a width substantially equal to the width of two adjacent pockets at their outer ends, means for supporting said brushes above said pockets, means for causing vertical reciprocatory movements of said brushes to raise and hold them above said pockets and for permitting them to descend with their lower ends projecting into said pockets, and means for causing reciprocatory movements of the said brushes, movements in one direction being effected with the brushes in the said pockets and in the opposite direction with the brushes above the said pockets, the brush for shifting the said beans or other articles inwardly upon said carrier entering the said pockets at their outer ends and those for moving the beans outwardly upon said carrier entering the said pockets at their inner ends, and means for contacting with the last mentioned brushes when in their innermost positions and before they enter the inner ends of the pockets upon their movements outwardly therein for compressing the said brushes to a width substantially equal to that of the inner ends of two adjacent pockets.

16. In a bean snipping machine, the combination of an annular carrier having pockets therein for receiving beans or other like articles the ends of which are to be snipped or trimmed off, said pockets extending transversely of said carrier, means for causing revolution of said carrier, a plurality of relatively flat brushes for moving the said beans or other articles longitudinally inwardly and outwardly in said pockets, the said brushes occupying planes extending transversely of the said pockets and each being of a width substantially equal to the width of the outer ends of two adjacent pockets, means for raising and lowering the said brushes to positions above the said pockets and to positions with their lower ends projecting into said pockets, the brush for moving the said beans inwardly being permitted to move to its lowermost position when at the outer edge of said carrier and the brushes for moving the beans outwardly being permitted to move to their lowermost positions when adjacent the inner edge of said carrier, and means for shifting the first named brush outwardly and the second named brushes inwardly when in their raised positions and for shifting them in the opposite directions when they are in their lowered positions.

17. In a bean snipping machine, the combination of an annular carrier provided with pockets to receive beans or other like articles, the opposite ends of which are to be snipped or cut off, means for causing revolution of said carrier, relatively flat brushes situated above said carrier one of said brushes being adapted to cause movement of the said beans inwardly within the said pockets and the other brushes being adapted to shift the same outwardly therein, means for raising and lowering the said brushes, said means operating to raise the said brushes when the first named brush occupies its innermost position with respect to the said carrier and to raise the other of said brushes when they occupy their outermost positions with respect to said carrier, means for causing reciprocatory movements of said brushes transversely of said carrier, said last mentioned means being adapted to cause inward movement of the first named brush when in its lowermost position and outward movements of the other brushes when in like positions and to cause outward movement of the first named brush when in its raised position and inward movements of the other brushes when in like position, and means for causing oscillatory movements of said brushes in a plane parallel with the said carrier.

18. In a bean snipping machine, the combination of an annular carrier provided with pockets to receive beans or other like articles, the opposite ends of which are to be snipped or cut off, means for causing revolution of said carrier, relatively flat brushes situated above said carrier, one of said brushes being adapted to cause movement of the said beans inwardly within the said pockets and the other brushes being adapted to shift the same outwardly therein, means for raising and lowering the said brushes, said means operating to raise the said brushes when the first named brush occupies its innermost position with respect to the said carrier and to raise the other of said brushes when they occupy their outermost positions with respect to said carrier, means for causing reciprocatory movements of said brushes transversely of said carrier, said mentioned means being adapted to cause inward movement of the first named brush when in its lowermost position and outward movements of the other brushes when in like positions, and to cause outward movement of the first named brush when in its raised position and inward movements of the other brushes when in like position, and means for causing movements of the said brushes in a plane parallel with the said carrier with the same speed of movement as that of the carrier.

19. In a bean snipping machine, the combination of an annular carrier provided with pockets for receiving beans or other like articles to be transported thereby, brushes for operating in said pockets for causing movement of the beans longitudinally therein, a bar situated above said carrier for slidably supporting two of said brushes, a bar extending transversely of the first named bar for slidably supporting the other of said brushes, said bars having rigid connection with each other at a point practically coincident with the axis of revolution of said carrier, a support for said bars, means for causing vertical reciprocatory movements of said support to raise and lower the supports for said brushes, means for causing reciprocatory movements of the first two named brushes upon said bar, means for causing reciprocatory movement of the other of said brushes, and means for simultaneously causing oscillatory movements of said brushes in a plane parallel with the said carrier.

20. In a bean snipping machine, the combination of an annular carrier provided with pockets for receiving beans or other like articles the opposite ends of which are to be snipped or cut off, brushes for operating in said pockets to adjust the said beans longitudinally therein in the direction desired, a bar extending diametrically of the said annular carrier and situated above the latter upon which two of the said brushes are slidably supported, a second bar extending substantially at right angles to the first named bar and having rigid connection therewith, a rocking arm having operative connection with one of the first named brushes, means for connecting the latter with the other of the said first named brushes whereby rocking movements of the said arm cause reciprocatory movements of the said brushes upon their supports, and a second rocking arm having operative connection with the second named brush, whereby the rocking movements thereof cause reciprocatory movements thereof upon its support, means for raising and lowering the brush supports so as to lift the lower ends of said brushes above the said pockets and to lower them into the said pockets, and means for rocking the supports for said brushes to cause horizontal movements thereof in a plane parallel to the said carrier.

21. In a bean snipping machine, the combination of an annular carrier provided with pockets for receiving beans or other like articles, the opposite ends of which are to be snipped or cut off, means for causing revolution of said carrier in a horizontal plane, concentric rocking shafts supported concentrically of the said carrier, one of the said shafts being provided with radial arms at its upper end portion, bars supported upon said arms, brushes slidably supported upon said bars, one of the said bars being arranged transversely of the other of said bars, means for raising and lowering the said shafts to cause movement of the lower ends of the said brushes out of and into the said pockets, means for causing rocking movements of the outer of said concentric shafts having the arms upon which the said bars are supported to cause movement of said brushes in a horizontal plane parallel to the plane of said carrier, and means for causing rocking movement of the inner of said concentric shafts and connections between the said inner concentric shaft and the said brushes whereby reciprocatory movements thereof upon said bars are effected.

22. In a bean snipping machine, the combination of an annular carrier provided with pockets for receiving beans or other like articles, the opposite ends of which are to be snipped or cut off, means for causing the revolution of said annular carrier, concentric rocking shafts situated concentrically of the said annular carrier, a rotating cam for sustaining said shafts and the parts carried thereby, said cam effecting vertical reciprocatory movements of the said shafts, the outermost of the said shafts being provided with radial arms at its upper end, a bar extending diametrically across the said carrier, brushes slidably supported upon the outer ends of the said bar, another bar extending transversely of the first named bar and supported upon the other of said radial arms, a brush slidably supported upon the outer end portion of said last named bar, means for rocking the outer of said concentric shafts for causing corresponding movement of said brushes in a plane parallel wtih the plane of said carrier, means for rocking the inner of said concentric shafts, and connections between the upper end of said inner shaft whereby the rocking movements thereof cause reciprocatory movements of the said brushes upon the said bars.

23. In a bean snipping machine, the combination of an annular carrier provided with pockets for receiving beans or other like articles, the opposite ends of which are to be snipped or cut off, means for causing revolution of the said carrier, concentric shafts situated and slidably supported concentrically of the said carrier, the outer of said concentric shafts being provided with radial arms, brushes situated above said carrier and adapted to enter the said pockets and to be moved longitudinally thereof to cause movements of the beans in one direction or the other therein, means supported upon said arms for slidably supporting the said brushes, means for causing reciprocatory movements of the said shafts in their support to cause movements of said brushes toward and from the said carrier, means for rocking the outer of said concentric shafts for causing horizontal movements of said brushes in a plane parallel with the said carrier, means for simultaneously rocking the inner of said concentric shafts, and connections between the latter and the said brushes whereby reciprocatory movements of the said brushes are effected.

24. In a bean snipping machine, the combination of an annular carrier adapted to receive beans or other like articles, the ends of which are to be snipped or cut off, cutters associated with the said carrier and to which the beans or other articles are presented for the purpose of having their ends snipped or cut off, concentric shafts slidably supported concentrically of the said carrier, two of said arms being situated in practically the same vertical plane, a bar supported upon said arms and extending across the said carrier, a bar supported by the other of said arms which bar extends substantially at right angles to the first named bar, two brushes slidably supported upon the first named bar, one upon one end portion and the other upon the other opposite end portion, a brush supported upon the outer end portion of the other of said bars, means for causing reciprocatory movements of the said shafts to cause movements of the said brushes toward and over the said carrier, means for simultaneously rocking the said outer concentric shaft for causing rocking movements of the said brushes, means for causing rocking movements of the inner of said concentric shafts, and connections between the said inner shaft and the said brushes whereby the rocking movements thereof cause reciprocatory movements of the said brushes upon their support.

25. A bean snipping machine comprising a traveling carrier having bean receiving pockets situated in successive relation to each other, means for closing successively the said pockets as they move past predetermined points, mechanism for causing movement of said closing means back and forth over the said pockets to open and close the same, and means for shifting the said beans in the said pockets while the latter are closed.

26. In a bean snipping machine, the combination of a movable carrier having open pockets therein adapted to receive beans the ends of which are to be snipped off, with means moving at intervals in the same direction and at the same speed as said carrier co-operating with said pockets to close the same successively and form closed containers to hold said beans as they are shifted therein and in the opposite direction at alternate intervals.

27. In a bean snipping machine, the combination of a movable carrier having open pockets therein adapted to receive beans the ends of which are to be snipped off, with means moving at intervals in the same direction and at the same speed as said carrier co-operating with said pockets to close the same successively and form closed containers to hold said beans and in the opposite direction at alternate intervals, and means for effecting movement of said beans transversely of said carrier while held in said closed containers.

28. In a bean snipping machine, the combination of a movable carrier having open pockets therein adapted to receive beans the opposite ends of which are to be snipped off, means situated in spaced relation with respect to each other which are adapted to be moved at intervals toward and from the said pockets to close and open the same, means for causing movements of said closing means transversely of the last mentioned movements, and means for effecting shifting movement of the beans in the said pockets in one direction or the other while the first named means occupies a position in closed relation with respect to said pockets.

29. In a bean snipping machine, the combination of a traveling carrier having pockets therein adapted to receive beans or other like articles, the ends of which are to be snipped or cut off, means for successively moving the beans in opposite directions in said pockets, said means moving back and forth transversely of the said carrier and longitudinally of the said pockets, and means for causing oscillatory movements of the said bean moving means in directions transversely of the said pockets.

30. In a bean snipping machine, the combination of a traveling carrier having pockets therein adapted to receive beans or other like articles, the ends of which are to be snipped or cut off, means for successively moving the beans in opposite directions in said pockets, said means moving back and forth transversely of the said carrier and longitudinally of the said pockets, means for holding the said bean moving means above the said pockets when moving in one direction and permitting the same to enter the said pockets when moving in the opposite direction, and means for causing oscillatory movements of the said bean moving means transversely of the said pockets.

In testimony that I claim the foregoing as my invention I have hereunto signed my name this 28th day of February A. D. 1920.

ARTHUR P. WOLFE.